April 8, 1958   J. L. ROBB   2,830,281
BRANCH LINE TERMINAL FOR INSULATED PARALLEL WIRES
Filed June 27, 1956

INVENTOR
JAMES L. ROBB
BY
ATTORNEY

United States Patent Office 2,830,281
Patented Apr. 8, 1958

2,830,281

BRANCH LINE TERMINAL FOR INSULATED PARALLEL WIRES

James L. Robb, Hickory, N. C., assignor to Superior Cable Corporation, Hickory, N. C., a corporation of North Carolina Application June 27, 1956, Serial No. 594,215

8 Claims. (Cl. 339—198)

This invention relates to a terminal device for electric wires and consists more particularly in new and useful improvements in a branch circuit terminal for a pair of juxtaposed, insulated, parallel wires such for example, as are customarily strung from pole to pole in telephone and other communication systems.

Under present practices, the connection of a branch circuit to a pair of parallel wires in a communication system has presented a considerable problem because of the necessity of dead ending the wires in both directions at the point where the connection is desired. The dead ended wires must be led down the pole and into a terminal box which is mounted on the pole, after which a drop wire connection is made to the terminal. This procedure requires two dead end fittings and enough extension wire to bring the ends of the wires down into the terminal, which not only adds to the cost of installation, but inasmuch as the parallel wires are stretched from pole to pole with a minimum of slack left in the wires, such an installation is both time consuming and troublesome. When making such a connection, after the wire has been dead ended in both directions, a piece of wire must be spliced to each of the parallel wires in order to provide sufficient slack to bring the wires down the side of the pole and into the terminal.

It is the primary object of the present invention to overcome the disadvantages noted in the conventional practices and to provide a simple, relatively inexpensive terminal whereby a branch circuit may be connected to a pair of parallel wires without the necessity of dead ending the wires or otherwise disturbing the original installation.

Another object of the invention is to provide a terminal for the connection of a branch circuit to a pair of parallel wires, which renders unnecessary the splicing of extensions between the parallel wires and the terminal.

Still another object of the invention is to provide a terminal which is so designed and constructed that a branch circuit may be connected directly to a pair of parallel wires, suspended in taut condition from pole to pole.

A further object of the invention is to provide a terminal for the connection of a branch circuit, wherein advantage is taken of the normal tension in the parallel wires strung from pole to pole, to sustain a physical pressure contact between the points of connection to the parallel wires.

A still further object of the invention is to provide a terminal of this nature which affords complete flexibility in the connection of dissimilar metals. In other words, the parallel wires to which the connection is to be made, may be galvanized iron or steel, copper, copper covered steel or aluminum and the branch circuit conductors may likewise be of any of these materials.

A further object is to provide a branch circuit terminal having means for protecting the connected wires from the weather so that when once installed the terminal requires no further attention.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views, Figure 1 is a view in side elevation showing the terminal installed, with the cover partly broken away to disclose the binding posts.

Figure 3:
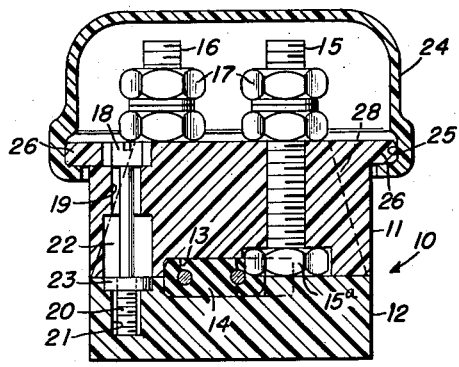
Figure 3 is an enlarged vertical sectional view taken transversely through the terminal assembly, on line 3—3 Figure 1.
Figure 4:
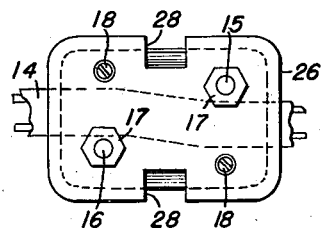
Figure 4 is a top plan view of the top section of the block, with the cover removed.
Figure 5:
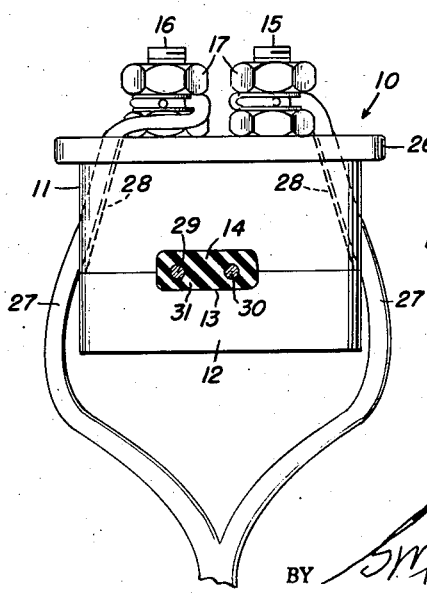
Figure 5 is an enlarged end view of the assembly with the branch circuit wires in place and the cover removed.

In its preferred form, the invention consists of a terminal block generally indicated by the numeral 10 and preferably formed of a suitable non-hydroscopic, high impact plastic dielectric material such as Bakelite. This block comprises two detachable parts, a main body 11 and a closure or back plate 12, designed to lie in contiguous abutment as shown in Figs. 3 and 4. The opposed abutting faces of the body 11 and back plate 12 are jointly provided with a wire receiving groove 13 which is preferably, substantially oval in transverse cross section, to snugly accommodate a portion of an electric line comprising a pair of juxtaposed, insulated parallel wires 14, extending longitudinally through the groove.

Figure 1:
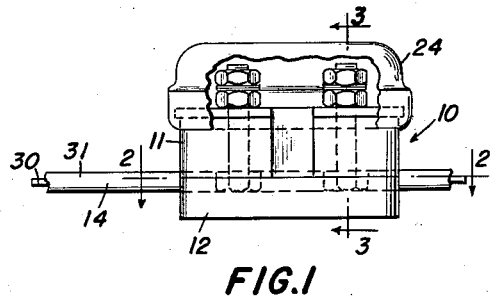
Figure 2:
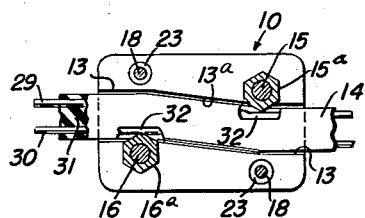
Figure 2 is a horizontal sectional view taken on line 2—2 of Figure 1, showing the back plate of the terminal block with the insulated wires in place.

As best seen in Figure 2, the groove 13 extends generally longitudinally of the block 10 but its intermediate portion 13a is diagonally offset with respect to the longitudinal axis of the block, at a lateral angle of substantially 10°, so that the opposite extremities of the groove, although parallel, are laterally offset with respect to one another, as and for the purpose hereinafter set forth.

On opposite sides of the groove 13, the body 11 is provided with a pair of binding posts 15 and 16 which are preferably cadmium plated or tinned bolts extending through the body and preferably having hexagonal heads 15a and 16a respectively, lying adjacent diagonally opposed points at the sides of the groove 13 and at least partially intersecting the lateral boundaries of the groove. The opposite ends of the binding posts 15 and 16 are threaded and project beyond the outer face of the body 11 where they are provided with the usual hexagonal nuts 17, also either cadmium plated or tinned and arranged in pairs on the respective binding posts for connecting a branch circuit as will be later described.

The back plate 12 is secured in place on the body 11 by screws 18 which, in the form of the invention shown, extend through registering openings 19 and 20 (Figure 3) in the body and back plate respectively. Preferably, an internally threaded metal socket 21 is provided in each of the openings 20 for engagement by the threads on the inner ends of the screws 18 and metal guide sleeves 22 are provided at the inner extremities of the openings 19 in the body 11. Fiber washers 23 may be applied to the screws 18 between the body 11 and back plate 12.

In order to protect the binding posts 15 from the weather, I provide a snap-on, neoprene cover 24, having an internal recess 25 around its open end and adapted to snap over a laterally projecting lip 26 which bounds the upper edge of the body 11. Access of the branch circuit conductors 27, to the binding posts 15 and 16 is afforded by inclined slots or notches 28 on opposite sides of the upper edge of the body 11.

As before indicated, my improved terminal is primarily designed for use in connection with a pair of juxtaposed, insulated parallel wires such as are customarily used in telephone communication systems. Generally, these lines 14 are formed of two relatively stiff, single strand wires, 29 and 30 (Figure 2), arranged side by side in a common insulating sheath 31 which completely protects and isolates the individual wires.

These lines are stretched for miles from pole to pole with a minimum of slack provided and in the installation of this terminal for connecting a branch circuit at any desired point in the line, a very simple operation is involved. First, a small portion of the insulation 31 is removed from the opposite outer sides of the line 14, to expose limited areas of the respective wires 29 and 30. As shown in Figure 2, the cutout areas 32 are diagonally opposed and spaced to correspond with the locations of the contact heads 15a and 16a respectively, so that when that section of the line 14 is inserted in the groove 13 of the body portion 11 and bent to conform to the contour of the groove, the exposed areas of the wires 29 and 30 are presented to the inwardly overlying portions of the respective contact heads. The back plate 12 is then applied with its complementary portion of the groove 13 embracing the opposite side of the line 14 and the screws 18 are installed and tightened to provide a unitary terminal block. When thus assembled, the normal tension of the electric line 14 causes a tendency for the diagonal portion of the line to straighten and results in a sustained physical pressure contact between the exposed areas of the wires and the respective contact heads.

The branch circuit lines 27 are then connected to the binding posts 15 and 16 by means of the nut assemblies 17, said branch circuit lines being arranged to lie in their respective inclined slots or recesses 28. The snap-on cover 24 is then applied with its internal groove 25 embracing the retaining lip 26 bounding the body portion 11 and any suitable means may be employed for weatherproofing and sealing the recesses 28 and the points where the main line 14 enters and leaves the terminal block.

In some instances it may be convenient to bring both circuit lines 27 into the block through one access notch 28. For example, where these lines are so located with respect to the pole that it would be awkward to install them through separate notches. Also, where multiple connections are made to a common terminal block, one pair of lines can be brought into the block through each access notch.

It will be apparent that by using this improved terminal block the operation of installing branch circuit lines is not only simplified but all of the disadvantages and problems which are presented in the conventional practice, are eliminated. Furthermore, by providing the groove 13 with an oblique or diagonal intermediate area 13a, between the points of electrical contact of the wires with the contact heads in the block, the normal tension of the line 14 causes a sustained physical pressure contact at these points.

Furthermore, regardless of the types of metals used in the main line and branch circuit leads, an effective electrical contact may be maintained. In other words, even though incompatible metals which are not normally adaptable to splicing by soldering or the like, are used in the main line and branch circuit leads, no problem is presented when this terminal block assembly is used.

From the foregoing it is believed that the invention may be readily understood by those skilled in the art without further description, it being borne in mind that numerous changes may be made in the details disclosed, without departing from the spirit of the invention as set forth in the following claims.

I claim:

1. A branch circuit terminal for an electric line including a pair of juxtaposed, insulated parallel wires, said terminal comprising a main body of insulating material, a line receiving groove extending longitudinally thereof, the opposite ends of said groove being laterally offset with respect to its longitudinal axis, by a diagonal intermediate portion, a pair of contact members mounted in said body on opposite sides of said groove at diagonally spaced points, said members extending angularly with respect to the axis of said groove and having contact heads, at least portions of which extend laterally within the confines of opposite sides of said groove for electrical contact with respective parallel wires lying in said groove, the opposite ends of said contact members projecting from said body and terminating in binding posts for a branch circuit, and means for clamping a portion of said lines in said groove.

2. A branch circuit terminal for an electric line including a pair of juxtaposed, insulated parallel wires, said terminal comprising a block of insulating material, a line receiving groove in one face of said block, extending longitudinally thereof, the axes of opposite ends of said groove being parallel and laterally offset with respect to one another with an intervening diagonal portion connecting said ends; a pair of contact members mounted in said block on opposite sides of said groove at diagonally spaced points, said members extending perpendicular to said groove and having pressure contact heads, at least portions of which extend laterally within the confines of respective sides of said groove, adjacent opposite ends of said diagonal portion, for electrical contact with exposed portions of respective parallel wires lying in said groove, whereby, the normal tension of said electric line causes a sustained physical pressure contact between said wires and contact members, said contact members projecting through said block and terminating in binding posts which protrude from the opposite face of said block, a back plate of insulating material overlying said groove, and means for removably securing said backplate to said block.

3. A branch circuit terminal as claimed in claim 2, wherein said line receiving groove is formed jointly in the abutting faces of said block and back plate.

4. A branch circuit terminal as claimed in claim 2, including a cover member removably secured to said block and overlying said binding posts.

5. A branch circuit terminal as claimed in claim 4 wherein said block is provided with access grooves in its opposite sides to accommodate branch circuit lead lines connected to said binding posts.

6. A branch circuit terminal for an electric line including a pair of juxtaposed, insulated parallel wires, said terminal comprising a block of insulating material, a line receiving groove in said block, extending longitudinally thereof and having at least a portion thereof diagonally offset with respect to the longitudinal axis of said block, a pair of contact members mounted in said block on opposite sides of said groove and extending at least partially within the confines of opposite sides of said groove, binding posts connected to said contact members, and means for retaining a portion of said electric line in said groove with the respective wires thereof in electrical contact with said contact members, whereby, the normal tension of said electric line causes a sustained physical pressure contact between said wires and contact members.

7. A branch circuit terminal for an electric line including a pair of juxtaposed, insulated parallel wires, said terminal comprising a block of insulating material, wire receiving openings at opposite ends of said block, laterally off-set with respect to one another, a diagonal recess connecting said openings; adapted to receive a portion of an electric line projecting through said openings, and a pair of diagonally spaced, pressure contact members mounted in said block on opposite sides of said recess and projecting in opposite directions at least partially within the confines of said recess, the distance between parallel lines intercepting the projecting extremities of opposite contact members, being less than the width of an electric line extending between said contact members, whereby, the normal tension of said electric line causes a sustained physical pressure contact between said wires and contact members.

8. A branch circuit terminal for an electric line including a pair of juxtaposed, insulated parallel wires, said terminal comprising a block of insulating material, wire receiving openings at opposite ends of said block, laterally off-set with respect to one another, a diagonal recess connecting said openings, adapted to receive a portion of an electric line projecting through said openings, and a pair of diagonally spaced, pressure contact members mounted in said block on opposite sides of said recess and respectively projecting inwardly at right angles to the longitudinal axis of said recess, at least partially within the confines of the latter, the distance between parallel lines intersecting the projecting extremities of opposite contact members, being less than the width of an electric line extending between said contact members, whereby, the normal tension of said electric line causes a sustained physical pressure contact between said wires and contact members.

References Cited in the file of this patent

UNITED STATES PATENTS

| | | |
|---|---|---|
| 1,698,820 | Meuer | Jan. 15, 1929 |
| 2,408,045 | Cottrell | Sept. 24, 1946 |
| 2,654,857 | Finkel | Oct. 6, 1953 |

FOREIGN PATENTS

| | | |
|---|---|---|
| 6,699 | Great Britain | 1907 |